June 20, 1972  HIROSHI KAWAGUCHI  3,671,080
DEVICE FOR REGULATING THE PRESSURE BETWEEN FRONT
AND REAR BRAKE CYLINDERS
Filed Jan. 21, 1971

INVENTOR.
HIROSHI KAWAGUCHI
BY
McGlew + Tuttle

United States Patent Office 3,671,080
Patented June 20, 1972

3,671,080
DEVICE FOR REGULATING THE PRESSURE BETWEEN FRONT AND REAR BRAKE CYLINDERS
Hiroshi Kawaguchi, Toyota-shi, Japan, assignor to Toyota Jidosha Kogyo Kabushiki Kaisha, Toyota-shi, Aichi-ken, Japan
Filed Jan. 21, 1971, Ser. No. 108,516
Claims priority, application Japan, Jan. 22, 1970, 45/5,415
Int. Cl. B60t 13/00
U.S. Cl. 303—6 C
6 Claims

ABSTRACT OF THE DISCLOSURE

A regulating device for controlling the brake pressure between front and rear brake cylinders in response to the operation of a brake pedal causing the discharge of a pressure fluid from a master cylinder includes a system in which the master cylinder is connected to the cylinders of the front wheels for actuating them. The system includes a regulating device disposed between the front wheel fluid pressure connection and the rear wheel fluid pressure connection for providing a pressure balanced actuation of the rear wheel brake cylinders. The regulating device includes a housing having an inlet for the pressure fluid supplied by the master cylinder and an outlet spaced from the inlet for delivering the pressure fluid to the rear wheel brake cylinders. The housing defines a first inlet chamber which is connected to the inlet of the device and a second chamber which is connected to the discharge and two valve members are arranged to move within the respective chambers. The valve members are constructed and arranged such that the first one regulates the flow from the first chamber into the second and the second one regulates the flow through the outlet. The two valve members affect opening and closing of the respective chambers in accordance with the relationship between the effective cross-sectional areas of the both valve members and the force of two biasing springs. Communication between the first and second fluid chambers is thus established intermittently and causes an increase of the fluid pressure delivered to the rear wheels at a rate smaller than that which is delivered by the master cylinder. When the fluid pressure of the master cylinder exceeds a predetermined value, the second piston closes the outlet of the housing because of the fluid differential pressure between the two fluid chambers to maintain a constant fluid control pressure on the rear wheel control cylinders.

SUMMARY OF THE INVENTION

This invention relates in general to the construction of regulating devices particularly for fluid brake systems of automobiles and, in particular, to a new and useful regulator for controlling the brake pressure between front and rear brake cylinders in response to the operation of a brake pedal.

Usually, the wheel cylinders which are located at the front and rear wheels are supplied with a pressure fluid from the master cylinder in which a fluid pressure corresponding to the amount of physical effort applied to the brake pedal is formed. When the vehicle is to be braked, the load to be applied to the front wheel is increased due to the inertia force exerted on the center of gravity of the vehicle, while the load to be applied to the rear wheel is decreased. Therefore, the frictional force between the tire and the road at the rear wheel is decreased, thus causing earlier locking of the rear wheel. Consequently, a regulating valve assembly is provided between the master cylinder and the wheel cylinder at the rear wheel in order to change the fluid pressure of the wheel cylinder at the rear wheel in a definite proportional relationship.

It is well-known that the ideal relationship between these two fluid pressures is represented by a curve where the fluid pressure $P_w$ of the rear side taken on the axis of ordinates is gradually decreased with respect to the fluid pressure $P_m$ at the front side taken on the axis of abscissas. The regulating valve assembly is designed to obtain the relationship between the fluid pressures of the front and rear wheels by dividing such a curve into several regions and approximating them linearly. In conventional regulating valve assemblies, however, the cut valve for producing a flat portion of the curve is operated by only one of said two fluid pressures, and therefore, the size of the pressure regulating spring adapted to stand against the operating fluid pressure is increased, resulting in the increase in the overall dimension of the valve. When the operating fluid pressure is instantly increased, the piston of the cut valve is closed by inertia due to the same reason as mentioned above. Consequently, cutting action may be performed at a fluid pressure other than the set pressure. In this case, braking force available at the rear wheel will be insufficient for a time and smooth braking will not be accomplished. Moreover, in conventional regulating valve assemblies, one end of the cut valve is in communication with atmosphere, and therefore, the oil to be supplied by the piston of the master cylinder at the time of actuation of the cut valve pison may be lost, and fluid leakage from the sealed portions to the outside may be caused.

In accordance with the invention there is provided a regulating valve assembly constructed so that the cut valve of the assembly is operated by a differential pressure between the fluid pressure of the master cylinder and the fluid pressure of the wheel cylinder at the rear wheel, thereby providing stable cutting action even during an instantaneous or shock-increase in the operating fluid pressure. The invention regulator enables reduction in size of the pressure regulating spring required for the cut valve, elimination of oil loss at the time of actuation of the cut valve, and elimination of fluid leakage from around the piston of the cut valve.

The invention relates to a vehicle brake system wherein a pressure fluid of the master cylinder is supplied to the wheel cylinders at the front wheels and the wheel cylinders at the rear wheels are supplied with the regulated pressure fluid; a regulating valve assembly for regulating the rear brake cylinder pressure according to this invention comprises, a first fluid chamber having an inlet into which a pressure fluid from the master cylinder is introduced, and a second fluid chamber having an outlet for supplying pressure fluid to the wheel cylinder at the rear wheel. A first valve is provided between said two fluid chambers, and a second valve is provided at the outlet of said second fluid chamber. The first and second fluid chambers are brought into communication by the position of the first valve until the fluid pressure in the first fluid chamber reaches the first set value; the fluid pressure in the second fluid chamber is decreased by the position of the first valve at a certain rate with respect to the fluid pressure in the first fluid chamber until the fluid pressure in the first fluid chamber reaches the second set value after exceeding the first set value. The outlet of the second fluid chamber is closed by movement of the second valve due to a differential pressure between the fluid pressure in the first fluid chamber and the fluid pressure in the second fluid chamber when the fluid pressure in the first fluid chamber exceeds the second set value.

Accordingly, it is an object of the invention to provide an improved regulating device for controlling the brake pressure between the front and rear wheel brake cylinders of an automobile brake system.

A further object of the invention is to provide a regulating device which includes a housing having an internal chamber which is adapted to be connected to the master cylinder of a brake system and includes a second chamber which is connected to an outlet for supplying a control pressure to the rear brake cylinders and which also includes a pair of valve members cooperatively movable within said two cylinders, one valve member controlling the flow from the inlet to the second chamber, and the other valve controlling the outflow through the outlet to the rear brake cylinders and with biasing means associated with each of the brake valves permitting controlled movement of the valves in order to provide a stable control pressure for the rear brake cylinders even during an instantaneous or shock-pressure increase applied to the inlet.

A further object of the invention is to provide a control device for a fluid brake system of an automobile which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
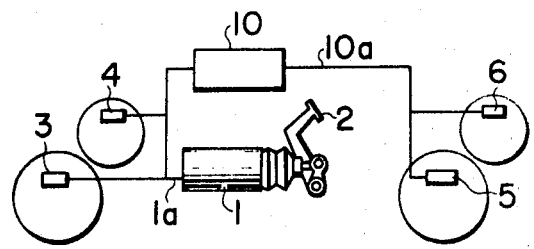
FIG. 1 is a schematic view of a fluid brake control system for vehicles having a controller constructed in accordance with the invention.

Referring to FIG. 1, a master cylinder 1 is operated by a brake pedal 2 to supply a control pressure to wheel cylinders 3 and 4 of associated front wheels and to wheel cylinders 5 and 6 of associated rear wheels. These wheel cylinders 3, 4, 5 and 6 are attached to, for example, an inside expansion type drum brake (not shown) and are adapted to brake the drum by expanding the brake shoe when a pressure fluid is supplied. A fluid having a pressure $P_m$ corresponding to the amount of physical effort applied to the pedal 2 supplied from the master cylinder 1 through a tube 1a to the wheel cylinders 3 and 4 at the front wheel. The wheel cylinders 5 and 6 at the rear wheel are supplied with a fluid, whose pressure $P_w$ has been regulated by a regulating valve assembly 10, through a tube 10a.

Figure 3A:
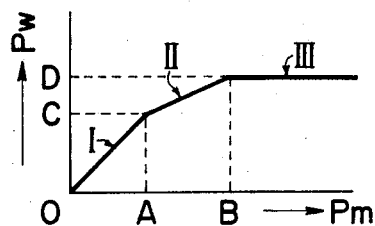
FIG. 3a is a curve indicating the static pressure characteristic diagram of a vehicle brake fluid system which is obtained by use of a regulating device of the invention.
Figure 3B:
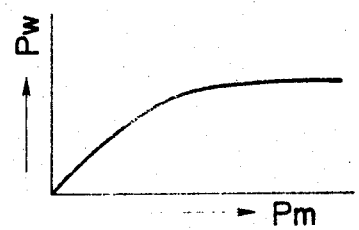
FIG. 3b is an ideal pressure regulating characteristic diagram.

Shown in FIG. 3b, is an ideal characteristic diagram of pressure to be regulated by the regulating valve assembly 10. As shown in FIG. 3b, the ideal characteristic is expressed by a line in which the fluid pressure $P_w$ of the wheel cylinder at the rear wheel is gradually decreased with respect to the fluid pressure $P_m$ of the wheel cylinder at the front wheel or of the master cylinder.

Figure 2:
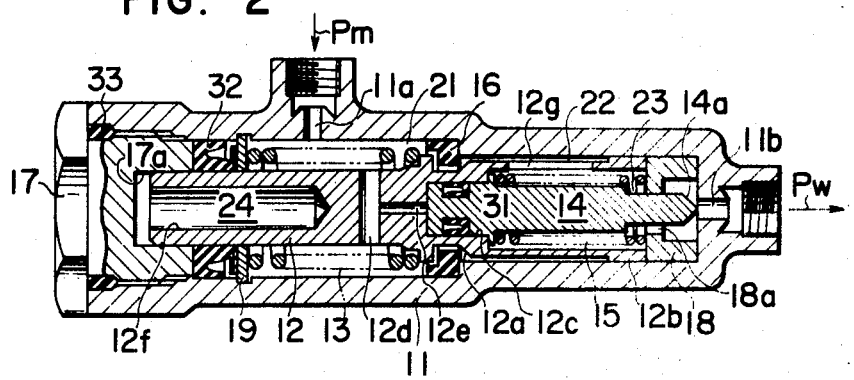
FIG. 2 is a longitudinal sectional view of the controller on an enlarged scale.

The regulating valve assembly according to the invention, as shown in FIG. 2 comprises, a housing or cylinder 11 having a first fluid chamber 21 which communicates with a fluid inlet 11a and a second fluid chamber 22 which communicates with a fluid outlet 11b. A pressure regulator valve piston 12 is located within the housing along with a cut valve piston or second piston 14 having a valve surface 14a at one end thereof. Springs 13 and 15 bias the pistons 12 and 14 relative to each other and to the housing in a controlled manner. The piston 12 is adapted to seat against a valve seat 16 which is made of sealing material. A plug 17 closes one end of the housing. The piston 14 carries a guide seat for guide piston portion 18 at the end adjacent to the outlet 11b. The guide seat 18 provides an alignment means for the piston 14 during its movement. The biasing spring 13 has one end bearing against a stop ring 19 held by the housing and an opposite end bearing against a shoulder of the valve piston 12.

The pressure regulator valve piston 12 is provided with a tapered valve surface 12a in the position opposite to the valve seat 16. The tip of a hollow portion 12b extending to the right of the valve surface 12a is brought into contact with the guide seat 18 by the differential pushing forces of the springs 13 and 15. A cylinder hole 12c is formed at the innermost part of the hollow portion 12b. Another end of the cut valve piston 14 located within the hollow portion 12b is inserted into said cylinder hole 12c.

A first fluid chamber 21 and a second fluid chamber 22 are formed at the periphery of the pressure regulator valve piston 12 with the valve seat 16 between. Fluid having the pressure $P_m$ produced by the master cylinder is introduced into the first chamber 21 through the inlet 11a. The fluid in the first chamber 21 is directed through an opening 12g made in the hollow portion 12b of the piston 12 to a space 23 at the periphery of the cut valve piston 14. The fluid reaches the outlet 11b through a communicating hole 18a made in the guide seat 18 and is finally discharged as a fluid having the pressure $P_w$. Communication between the cylinder hole 12c in the piston 12 and the first fluid chamber 21 is established by means of communicating holes 12d and 12e.

The plug 17 for closing one end of the cylinder 11 has a guide hole 17a at the inner end thereof, into which the rear end of the piston 12 is inserted. The guide hole 17a and an inner hole 12f made at the rear end of the piston 12 cooperate to define an atmospheric chamber 24. The reference numerals 31, 32 and 33 indicate fluid-enclosed seals which are provided in the specified positions at the pistons 14 and 12 and plug 17, respectively.

The spring 13 presses the pressure regulator valve piston 12 in a right-hand direction and the spring 15 presses the cut valve piston 14 in a left-hand direction. The force of the spring 13 is selected to be larger than that of the spring 15, and therefore, the piston 14 is pressed against the piston 12 when the tip of the hollow portion 12b of the piston 12 has been brought into contact with the guide seat 18 as illustrated in FIG. 2. At this time, the valve surface 12a of the piston 12 is separated from the valve seat 16, and therefore, communication between the first fluid chamber 21 and the second fluid chamber 22 is established, and the valve surface 14a of the piston 14 opens toward the outlet 11b.

The operation of the regulating valve assembly, described with reference to FIG. 3a, is as follows:

In FIG. 3a, the fluid pressure $P_m$ of the wheel cylinder at the front wheel or of the master cylinder is taken on the axis of abscissa. This pressure $P_m$ is divided into three regions; a region smaller than the value A, a region between the value A and value B, and a region larger than the value B. The fluid pressure $P_w$ of the wheel cylinder at the rear wheel is taken on the axis of ordinate. This pressure varies along three lines I, II and III, by means of which the ideal characteristic shown in FIG. 3b is approximated.

In examining the operation of the pressure regulator valve piston 12, the piston 12 can be regarded as integral with the piston 14 when the fluid pressure $P_m$ is in the region smaller than the value B. The effective cross-sectional area of the piston 12 to which a pressure fluid is applied under the opened condition of the valve comprising the valve surface 12a of the piston 12 and the valve seat 16 (to be referred to as pressure regulator valve hereinafter) corresponds to the cross-sectional area $S_1$ of the small diameter portion at the left side of the piston 12. The effective cross-sectional area of the pressure regulator valve 12a, 16 corresponds to the cross-sectional area $S_2$ of the inner hole of the valve seat 16 and, $S_1$ is smaller than $S_2$. The forces for the springs 13 and 15 are designated $F_1$ and $F_2$, respectively. Since $F_1$ is larger than $F_2$, the differential force $(F_1-F_2)$ pushes the piston 12 to the right, in opposition to which the force $S_1P_m$ produced by the fluid is applied. Therefore, if the pressure $P_m$ is under the following condition, $$S_1P_m \leq F_1-F_2$$

the piston 12 remain stationary with the tip of the hollow portion 12b in contact with the guide seat 18. When the pressure $P_m$ is increased above $(F_1-F_2)/S_1$, the piston 12 is moved to the left until the pressure regulator valve 12a, 16 is closed. The value A is the value of pressure $P_m$ at this time. In the region where the pressure $P_m$ is smaller than the value A, the pressure regulator valve is in communication. Consequently, the fluid pressure $P_w$ in the second fluid chamber 22 is equal to the pressure $P_m$ in the first fluid chamber 21 and they are in the relationship represented by the line I in FIG. 3a.

When the fluid pressure $P_m$ in the first fluid chamber 21 is further increased under the closed condition of the pressure regulator valve 12a, 16, the pressure regulator valve is again opened. Thus, the opening and closing of the pressure regulator valve are repeated in the same manner as described above, thus performing pressure regulation. At this time, the relationship between the fluid pressures $P_m$ and $P_w$ is expressed as follows:

$$(S_2-S_1)P_m+(F'_1-F'_2)=S_2P_w$$

This relationship is continued in the region where the fluid pressure $P_m$ is larger than the value A. In this case, $F'_1$ and $F'_2$ are the forces indicated by the springs 13 and 15, respectively, when the piston 12 is moved to the left so as to close the pressure regulator valve 12a, 16. As is seen from the above relationship, the fluid pressure $P_w$ in the second fluid chamber 22 is increased at a rate smaller than 1, at the rate of $$\left(1-\frac{S_1}{S_2}\right)$$

with respect to the fluid pressure $P_m$ in the first fluid chamber 21 and the relationship expressed by the line II in FIG. 3a is established.

The force of the spring 15 for pushing the piston to the left and two opposing fluid pressures at both sides of the cut valve piston 14 are acting on this valve piston. Letting the effective cross-sectional area of the piston 14 be $S_3$, the rightward force is $S_3P_m$ and the leftward force is $$(S_3P_w+F_2)$$

The condition where the valve surface 14a causes the outlet 11b to close is expressed as $$S_3P_m > S_3P_w+F_2$$

Consequently, cutting action is accomplished when the differential pressure $(P_m-P_w)$ is larger than $F_2/S_3$. From this time on, the fluid pressure $P_w$ of the wheel cylinder at the rear wheel maintained at the fluid pressure D at which cutting action is started as shown in FIG. 3a, and the action shown by the line III is performed. As the differential pressure $(P_m-P_w)$ at the start of cutting action is smaller than either of the fluid pressure $P_m$ or $P_w$ at that time, the set force of the spring 15 can be reduced. Consequently, the size of the spring 15 can be reduced. Even if, for example, the fluid pressure $P_m$ in the first fluid chamber 21 is shockingly increased, the fluid pressure $P_w$ in the second fluid chamber 22 is accordingly increased, because the cut valve piston 14 is operated by differential pressure. Consequently, the difference pressure is not increased so much and erroneous operation of the piston 14 due to inertia is avoided. Furthermore, there will be no fear of loss of fluid to the outside, because the one end of the piston 14 is sheilded from atmosphere. Also, the loss of oil supplied by the master cylinder can be prevented, and therefore, loss stroke of the brake pedal can be reduced.

By virtue of the regulating valve assembly according to this invention, the relationship between the fluid pressures at the front and rear wheel cylinders is nearly approximated to the ideal characteristic and earlier locking of the rear wheel can be prevented. Consequently, it is expected that dangerous skidding of vehicles is prevented and that vehicle braking distance is reduced.

While a specific embodiment of the invention has been shown and described in detail to illustrate the application of the principles of the invention, it will be understood that the invention may be embodied otherwise without departing from such principles.

What is claimed is:

1. A regulating device for controlling the brake pressure between front and rear wheel brake cylinders in response to the operation of a brake pedal to discharge a pressure fluid from a master cylinder into the front brake cylinders, comprising a valve housing having an inlet for the pressure fluid supplied by the master cylinder and an outlet spaced from the inlet for delivering pressure fluid to the rear wheel brake cylinders, said housing defining a first fluid chamber therein connected to said inlet into which a pressure fluid from the master cylinder is introduced and a second fluid chamber alongside the first chamber connected to said outlet for supplying a pressure fluid to the rear wheel cylinders, a first valve provided between said two fluid chambers movable to close and open at the connection between said chambers, a second valve provided adjacent to the outlet of said second fluid chamber in said second fluid chamber, said first and second fluid chambers being brought into communication by the position of said first valve until the fluid pressure in the first fluid chamber reaches a first set value and said first valve closes the communication between said first and second chambers, and biasing means biasing said first and second valves relative to each other and to said housing, said valves and said biasing means being constructed and arranged to permit movement of said first and second valve members to cause the fluid pressure in the second fluid chamber to decrease by movement of said first valve at a certain rate with respect to the fluid pressure in said first chamber until the fluid pressure in the first chamber reaches a second value after exceeding the first predetermined value, said second valve being controlled to close the outlet of said second fluid chamber by means of a differential pressure between the fluid pressure in the first fluid chamber and fluid pressure in the second fluid chamber when the fluid pressure in the first fluid chamber exceeds the second set value.

2. A regulating device, according to claim 1, wherein said housing includes a shoulder portion between said first and second chambers defining a valve seat for said first valve being movable toward and away from said valve seat.

3. A regulating device, according to claim 2, wherein said biasing means includes a first spring having one end held by said housing and an opposite end engaged with said first valve urging it in an opened direction and a second biasing spring biasing said second valve in a direction toward said first valve away from said outlet to open said outlet.

4. A regulating device, according to claim 3, including a guide seat carried on said second valve and having leg portions surrounding at the end of said second valve said second valve having a central portion adapted to close said outlet and said second spring extending from said guide to said second valve.

5. A regulating device, according to claim 2, wherein said housing comprises a tubular member having an opening at one end which is closed by a plug, said plug having a recess into which said first valve is movable.

6. A regulating device, according to claim 5, wherein said first valve includes a recess portion communicating with the recess of said plug, said plug exposing said recess portion to atmosphere.

References Cited

UNITED STATES PATENTS 3,501,203   3/1970   Falk _____ 303—6 C

EVON C. BLUNK, Primary Examiner

H. S. LANE, Assistant Examiner